July 14, 1964 W. G. DELP 3,141,147

INTEGRALLY BIASED TUNING SLUG RETAINER

Filed May 26, 1961 4 Sheets-Sheet 1

INVENTOR.
WILLIAM G. DELP

BY
OSTROLENK, FABER, GERB & SOFFEN

ATTORNEYS

INTEGRALLY BIASED TUNING SLUG RETAINER

Filed May 26, 1961 4 Sheets-Sheet 2

INVENTOR.
WILLIAM G. DELP
BY
OSTROLENK, FABER, GERB & SOFFEN
ATTORNEYS

July 14, 1964 W. G. DELP 3,141,147
INTEGRALLY BIASED TUNING SLUG RETAINER
Filed May 26, 1961 4 Sheets-Sheet 3

INVENTOR.
WILLIAM G. DELP
BY
OSTROLENK, FABER, GERB & SOFFEN
ATTORNEYS

July 14, 1964 W. G. DELP 3,141,147

INTEGRALLY BIASED TUNING SLUG RETAINER

Filed May 26, 1961

4 Sheets-Sheet 4

INVENTOR.
WILLIAM G. DELP

BY

OSTROLENK, FABER, GERB & SOFFEN

ATTORNEYS

United States Patent Office 3,141,147
Patented July 14, 1964

3,141,147

INTEGRALLY BIASED TUNING SLUG RETAINER

William G. Delp, Pasadena, Calif., assignor to Standard Kollsman Industries Inc., Melrose Park, Ill., a corporation of Illinois Filed May 26, 1961, Ser. No. 112,957
3 Claims. (Cl. 336—131)

This invention relates to novel means for retaining threaded members in a support; and more particularly, to such integrally biased retainer constructions, whereby the threaded members are readily displaced axially by rotation therein.

In radio frequency (RF) and intermediate frequency (IF) circuitry there are often used tunable metallic members or slugs for precise tuning of associated coils in the circuits. Such slugs are threaded and are retained in their supports or coil forms by auxiliary springs, corrugations in the forms, or the like. For mass production products, as television tuners, radio receivers, such constructions entail relatively costly procedures for threading the slugs into their forms and/or applying biasing springs, etc. Small production tolerance variations of the slug or form dimensions greatly change the designed torque, insertion, or stability characteristics of the assembly.

In accordance with the present invention I provide novel self-biasing elements, integral in the coil form or slug support, that firmly retains the slug in any adjusted position. Such elements are generally in the form of thin longitudinal fingers or fins extending integrally from the interior surface of the form or support. Insertion of the slug is by simple axial pressure without rotation. The biasing is automatically established by the slug distending the fingers, that in turn grip the slug by a predetermined force. The slug can be directly displaced by rotation, as though threaded in. Further production tolerance variations are not significant in the resultant action. Should the slug reach an end of its stroke or position, further rotation in that direction merely causes harmless slippage.

The above and other advantages and objects of this invention will become more apparent from the following description of several exemplary applications thereof, made in connection with the drawings, in which.

Figure 1:
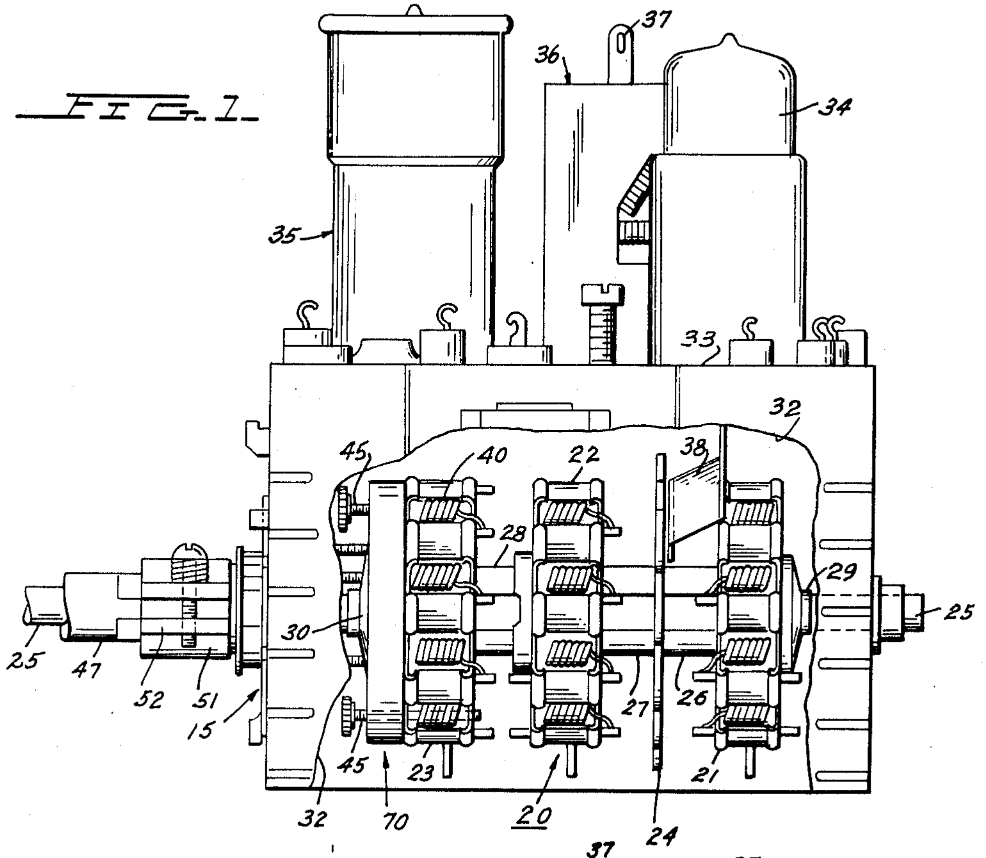
FIGURE 1 is a side elevational view of a VHF television tuner incorporating one form of my invention retainer.

The VHF television tuner 15 represents one of many applications of my invention. Such tuners contain twelve discretely tuned circuits, one for each of the selectable VHF channels. Each tuned circuit includes an adjustable oscillator coil section. The oscillator frequency for the particular channel is adjusted by manual rotation of a threaded metal slug or screw within the oscillator coil, longitudinally locating it for precise tuning. The invention thread biasing feature permits such individual adjusting of each threaded slug and firmly holds each slug or screw in its desired setting.

The rotatable member 20 of the tuner 15 is composed of the RF or input coil disc assembly 21, the interstage coil disc assembly 22, and the oscillator coil disc assembly 23. The RF coil disc assembly 21 is electrostatically shielded from disc assemblies 22, 23 by a metal detent disc 24. The coil disc assemblies 21, 22 and 23 together with detent disc 24 are suitably mechanically secured to the control or selector shaft 25 for rotation in unison. Integral spacers 26, 27 and 28 maintain the respective disc assemblies in predetermined axial position. End spring washers 29, 30 hold the rotor assembly 20 intact. The disc assemblies 21, 22, 23 mechanically interlock and contain the individual inductors or coils for the channels. Such assemblies are described in more detail in the copending patent application Serial No. 119,877 filed on June 27, 1961 for "V.H.F. Television Tuner Construction," and assigned to the same assignee.

The VHF tuner 15 is constructed as a box framed chassis 31, with a removable external shield 32. The usual stationary circuit components are mounted on the top plate 33, as are the RF amplifier tube 34 and mixer-oscillator tube 35. The antenna input coupling network 36 extends above plate 33 for connection through terminals 37, 37 to an external antenna. A fixed arcuate shield 38 (see FIGURE 1) depends from top plate 33, and separates the upper region between the RF and interstage disc assemblies 21, 22. In this way the RF stage circuitry, is shielded from the interior interstage and oscillator signals, for stability at high gain, and reduced radiation.

The oscillator disc assembly 23 contains an individual coil 40 for each VHF channel to be tuned. Each selector shaft (25) position circuitally connects an oscillator coil (40) and the associated interstage and antenna coils with the stationary tuner circuitry, as is understood by those skilled in the art. Each oscillator coil 40 is oriented longitudinally, with a threaded metal member 45 operable therein. The metal members 45, 45 are used to adjust the inductance value of the associated oscillator coil, and its frequency determination for the channel tuning. Such adjustment is presettable individually, in operation, through external manual control. This may be accomplished through screw-driver action on an end slot of the members 45, through a hollow fine tune shaft 47 as in the tuner 15, or by other means.

While the present invention is directed to the thread biasing and retaining feature for the tuning slug members 45, a brief description of the presetting mechanism 50 of the tuner 15 is presented. Further details of this mechanism (50) are set forth in the copending patent application Serial No. 121,148 filed on June 30, 1961 for "Preset Fine Tuning Mechanism for Television Tuners," and assigned to the assignee hereof. A collar 51 is coupled to fine tune shaft 47 through an integral yoke 52 and cross-screw 53. A transverse element 54 contains a cam-slot 55 engageable with a pin 56 extending from a pivoted gear plate 57. Plate 57 supports idler gear 58 on pin 56, and a driven gear 59 on shaft 60.

A drive gear 61 is secured with fine tune shaft 47 and operates idler gear 58 in either rotational direction. This in turn drives gear 59 to correspondingly rotate pinion 62 in either direction. Pinion 62 is selectively engageable with the gears 65 at the head of each threaded member 45. The channel positioned for tuning operation through control shaft 25 also locates its member 45 and associated head gear 65 in engageable relation with pinion 62. Pinion 62 is normally held biased away from engagement. When however the fine tune preset shaft 47 is rotated, the collar 51 is turned to displace pin 56, and so holds pin 56 on either of slot 55 during the fine tuning operation.

Figure 2:
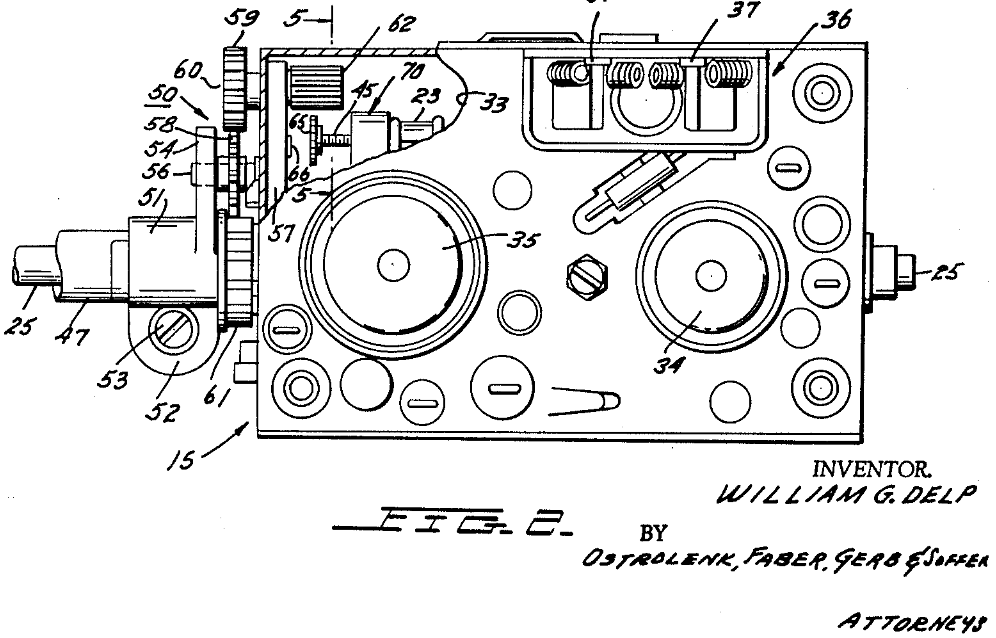
FIGURE 2 is a view of the tuner of FIGURE 1.
Figure 6:
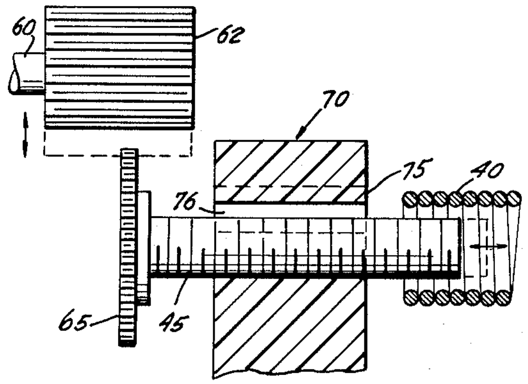
FIGURE 6 is a cross-sectional view taken along the line 6—6 of FIGURE 5.

The slot 55 is cammed to move the biased pinion 62 into engagement with the head gear 65 then opposite it, see FIGURES 2 and 6. Collar 51 thereupon slips on the shaft 47, and drive gear 61 turns idler 58, driven gear 59 the pinion 62, and in turn gear 65 and threaded slug member 45. Operation of fine-tune shaft 47 in either direction correspondingly effects directional movement of the threaded member 45 longitudinally of its associated oscillator coil 40.

In this manner the oscillator setting for any particular channel is adjusted precisely, through external operation of hollow shaft 47. Release of the shaft 47, results in pin 56 returning to the center of slot 55, and the biased pinion 62 becomes disengaged from any gear 65. Channel selection may thereupon proceed without any oscillator gear 65 interfering with the preset mechanism 50. The threaded oscillator slug members are firmly retained in composition ring 70, at their last preset positions. The precise tuning settings are thus maintained, and are individually readily resettable.

The important features of the present invention reside in the efficient, practical and effective manner of biasing retaining the threaded slug members 45 against displacement after setting; in permitting their ready resetting with reasonable torque application, and in effecting slippage in such thread retention when at either end of their axial positions or stroke. Their outer stroke position is established when the head gear 65 abuts stop 66 at the plate 57. Further turning of pinion 62 merely causes the threaded member 45 to slip in the mounting therefor in ring 70. The inner stroke of the members 50 occurs when their gear 65 abuts the face of ring 70, with similar slippage.

Figure 4:
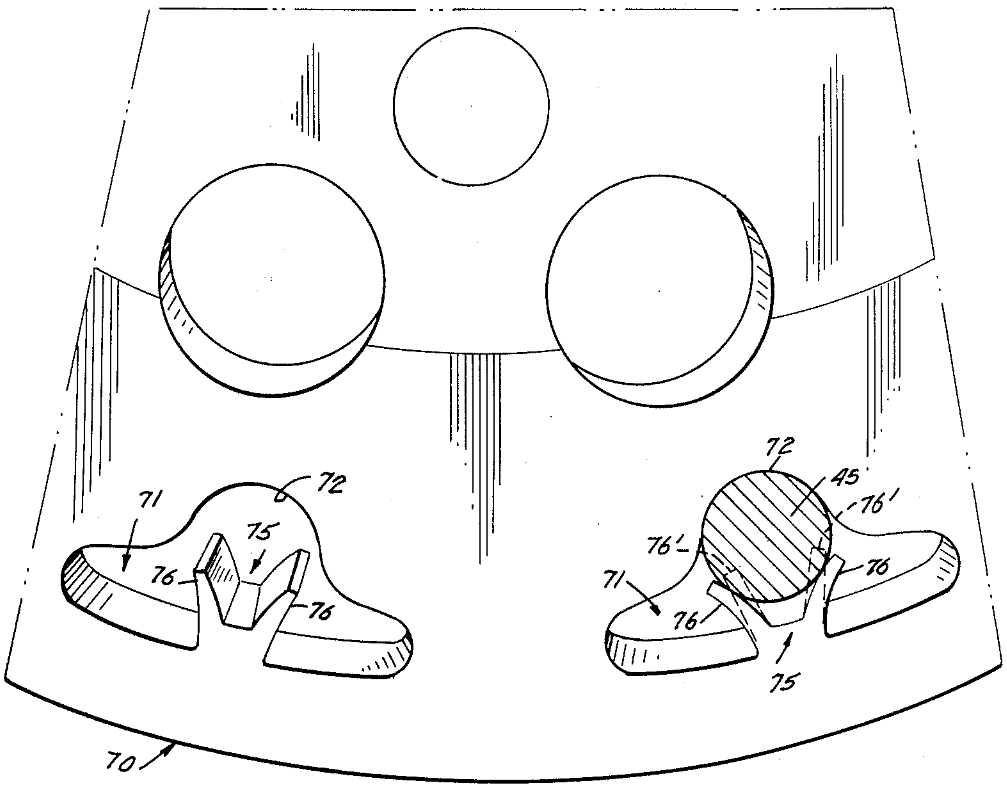
FIGURE 4 is a significantly enlarged view of a section, in perspective, of the invention tuner slug holder of the tuner of FIGURES 1 to 3.
Figure 3:
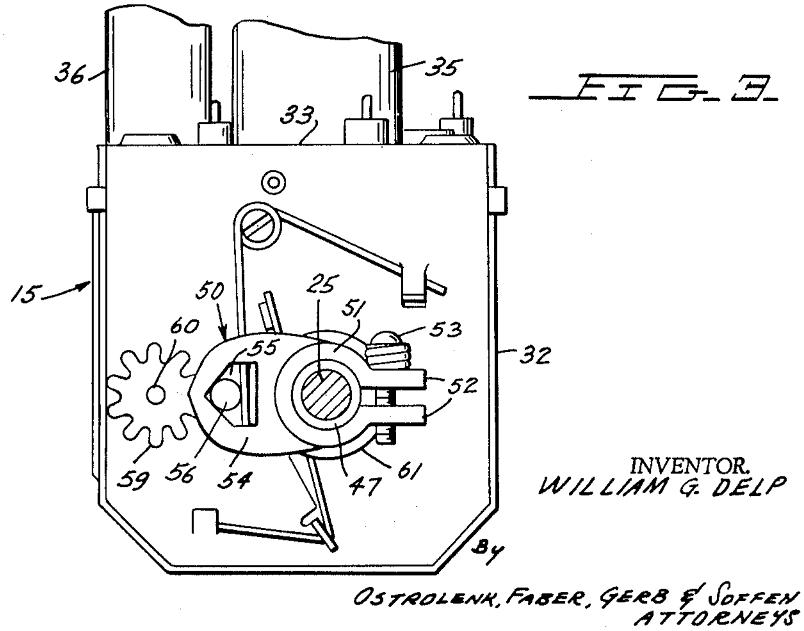
FIGURE 3, a view of the tuning control end thereof.

FIGURE 4 is a greatly enlarged showing, in perspective, of the bias-retaining construction of the ring 70. At each channel position is located a transverse cavity 71 incorporating a central arcuate portion 72 and an opposed retainer channel 75 between which a threaded slug member 45 is engaged. The channels 75 each contain two tongues or fingers 76, 76 extending at an acute angular relation best viewed at the left cavity (71). The spacing of the channel 75 from portion 72; the angular extent of fingers 76, 76; their relative thickness hence resilience; the nature of the material used; and the curvature of portion 72 all combine to determine the effectiveness of the grip on the member 45 therebetween. The effective torque desired to operate or turn the threaded members 45 in their retainer cavities 71 determines these particular relationships, in its design and construction.

Basically, the size of each cavity 71, channel 75, and fingers 76, are relatively small for typical threaded slugs 45. In the exemplary tuner 15 the outer diameter of the threaded screw 45, was one-sixteenth of an inch. The radial extent of the tongues 76, 76 for their mounting was of the order of one-thirty-second of an inch. With the axial thickness of ring 70 at three eighths of an inch, excellent retention, biasing, and torque characteristics result.

The exemplary material used for ring 70 was Dupont Delrin acetal resin. This permits mass one-shot production molding of ring 70, with excellent tolerances for the formation of the cavity (71) arc (72) channel (75), and fingers (76) for all twelve slug positions around the ring. Other materials may of course be used for forming the ring 70 and its constituent elements. The desirable qualities of such material is dimensional stability over wide ambient temperatures; low-loss dielectric constant; sufficient resilience in the integral fingers (76); and adaptable to efficient mass production.

One important advantage of the invention structure is the ready insertion of the threaded slugs (45) into the respective retainer-cavities 71. This is accomplished by simply axially sliding pressing each slug 50 between the channel (75) and the arcuate portion (72). No internal threading of the tongues 76 or portion 72 is required. The resilient composition material, and the resilient pressure along the fingers 76, 76 on the threaded member 45 accomplishes its retention. Further, and equally important, is the axial displacement such retention permits upon the rotation of the threaded body of the member 45, in either direction, in the same manner as though the channel (75) and portion 72 were internally threaded.

Figure 5:
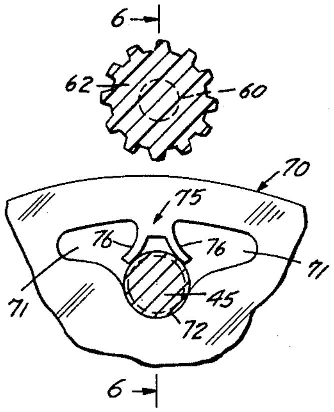
FIGURE 5 is an enlarged cross-sectional view through the oscillator tuning slug arrangement, taken along the line 5—5 of FIGURE 2.

The fingers 76, 76 are spread apart from their neutral position indicated in dotted lines at 76′ in FIGURE 5, to create the retention force or bias along the member 45 therein. The member 45 is pressed against the arcuate portion 72 and thereby firmly gripped in the cavity 71. Thus, the members 45 are pressed into their cavity retainers by simple production mechanism. Once in, they are firmly retained, yet are readily displaced axially by rotation. Such displacement in either direction is effected through the head gear 65 on the member's external end through fine tune shaft 47 and the mechanism 50, as described hereinabove.

Further, when the individual slug members 45 are preset in their precise tuning positions through mechanism 50 (or equivalent means), the invention retainer construction maintains and firmly grips the members (45) despite extremes encountered as to vibration, tuner operation, temperature change, and the like. In the exemplary tuner construction a rotational torque of ½ to 1½ inch-ounces was built into the retention design; and a force of 10 to 15 ounces for insertion (or removal) of the members (45) by axial action.

When any member 45 reaches either end of its stroke it simply slips upon further rotation urging it to that end. Upon rotation in the opposite direction, the member is thereupon directly moved axially away from such stroke end. No damage to the retainer means hereof occurs, and the members 45 return to their normal presetting function. Also, normal production variations in the outer diameter of any member 45, or the dimensions of the retainer means are automatically compensated for by the invention.

Figure 7:
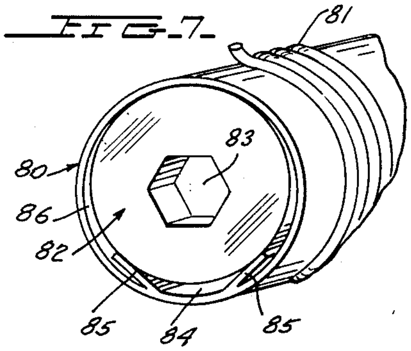

The present invention may be applied to other structures and for other purposes, as already stated. Another important tuner application is to construct the coil form for the oscillator coil of each panel of a VHF turret tuner with the integral slug retainer construction hereof. Coil forms for IF transformers, utilizing tuning slugs also may advantageously be constructed with the invention integral thread biasing means. FIGURE 7 is a perspective illustration of a coil form 80 upon which an RF, IF or other type of coil 81 is wound. A threaded tuning slug 82 is fitted into the end of coil form 80 for selective coaction with coil 81. Slug 82 contains an hexagonal cavity 83 for its rotation with a tool end. A cross-slot or other means may be employed therefor.

Figure 8:
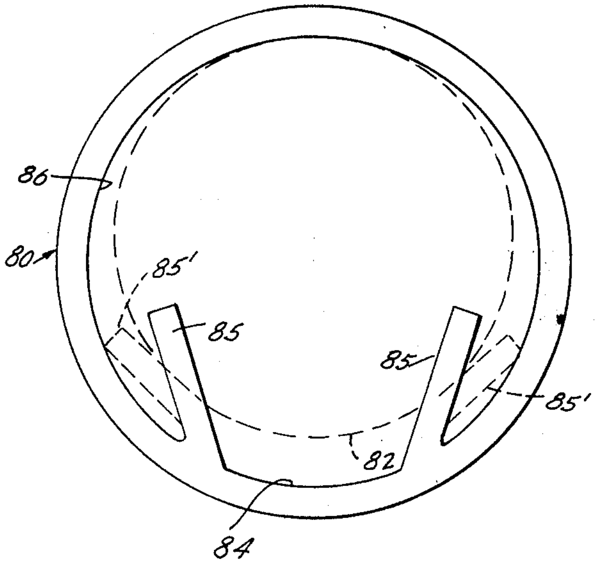
FIGURES 7 through 11 are end views of modified tubular forms containing integral thread biasing constructions in accordance with the present invention.

The coil form 80 contains two spaced tongues or fingers 85, 85 extending integrally along the inside surface 86 of the cylindrical form, longitudinally along the form. FIGURE 8 is an enlarged end view of coil form 80, per se. The fingers 85, 85 are integrally molded or extruded with the composition form 80. The channel base 84 separates the resilient fingers 85, 85, forming an acute angle. When the threaded slug (82) is inserted, the fingers 85 along the form 80, are spread out towards (or to) the inner surface 86, to positions shown in dotted lines 85′, 85′. The distended fingers 85, 85 build up a resilient counterforce against the body of slug 82, to constitute the bias-retention means. The slug 82 may be of brass, aluminum, ferrite, etc.

For tunable coil forms as 80, a suitable material is polypropylene, a high impact polyethylene, or the equivalent. Linear polyethylene permits simple fabrication, as by extrusion. Other materials and methods of fabrication, are of course contemplated by this invention. In an exemplary IF coil form 80, the O.D. was 0.218″; I.D., 0.177"; the channel base 84, 0.068"; the tube 80 thickness, and that of the fingers 85, 0.010"; and the free or undistended angle between fingers 85, 85 (as in FIGURE 8), at 36°. The invention may be applied in various other configurations, as for example illustrated in FIGURES 9, 10 and 11.

Figure 9:
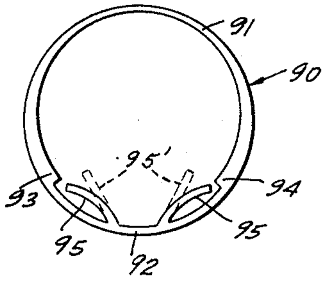

The coil form 90 of FIGURE 9 is of a cylinder with thin portions at 91, 92; and thicker portions at 93, 94. The fingers 95, 95 are extended along the length of the form 90, and in their free position are at 95', 95' shown in dotted lines. The fingers 95, 95 when pressed by a retained slug, are bent over into the recesses 96, 96 thereby formed. The integrally biased retention action prevails on the slug so positioned.

Figure 10:
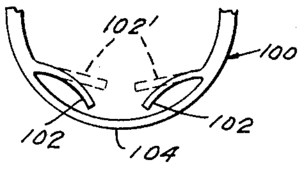
Figure 11:
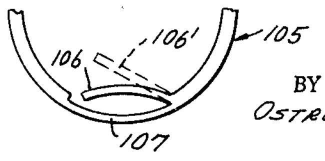

Further variations are illustrated in FIGURES 10 and 11 in partial form. Coil form 100 has two fingers 102, 102 along its length, extending towards each other in their free positions 102', 102'. An inserted slug presses fingers 102, 102 towards the thinner wall 104 under them, and establishes the biasing action herein intended.

In FIGURE 11 coil form 105 is provided with a single finger or tongue 106 extending along the form above a thinned wall portion 107. The free position 106 of the finger, shown in dotted lines, is pressed towards the thinned wall 107 in their biasing action on an inserted slug.

In the above I have described my invention in connection with a television tuner and in connection with a variable transformer such as an IF transformer. In both of these embodiments I illustrated the invention in a form in which the screw moved longitudinally as it was rotated. It will be obvious to those skilled in the art that the movements between the screw or slug member 45 and the fingers 76 are relative, and that either member 45 is held stationary while the fingers 76 move longitudinally or the reverse relative motion is obtained.

Figure 12:
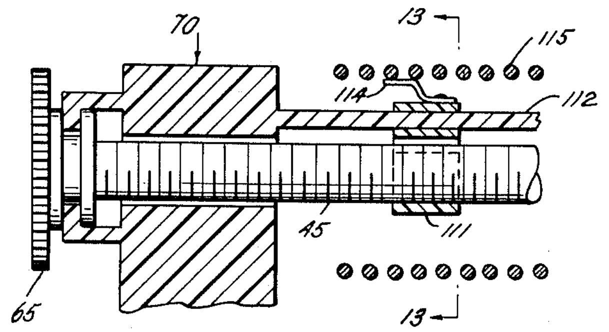
FIGURES 12, 13 and 14 illustrate a modified embodiment of my invention applied to a potentiometer in which the screw member is held against longitudinal motion during rotation.
Figure 13:
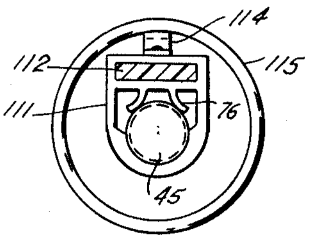
Figure 14:
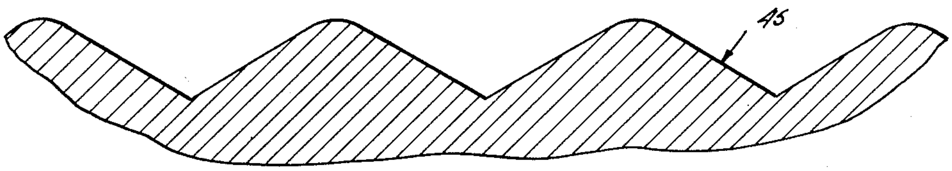

In the embodiment shown in FIGURES 12, 13 and 14 the invention is shown as applied to a potentiometer in which the screw member is held against longitudinal movement during its rotation and the finger carrying member moves transversely.

The numerals corresponding to the related parts of FIGURE 5 have been retained in order to illustrate this application. As shown, the ring 70 is held stationary against longitudinal movement while gear 65 is rotated and rotates the threaded member 45 which, together with ring 70, is held against axial movement.

The member 111 is slidably mounted on the slide rod 112 and is provided with fingers 76 which are spring pressed against the member 45 to provide a threading action in member 45 in a manner already described although there are no actual formed threads, as is well understood.

This slider may be a piece of Delrin molded to slide along the guide rod 112 and forming screw threads through the fingers 76 as described in detail in connection with FIGURE 5.

As the member 45 rotates, but is held against longitudinal movement, the member 111 with its fingers 76 in spring engagement with member 45 moves longitudinally along the guide rod 112. Carried on the member 111 is a finger 114 which is spring pressed into electrical contact engagement with the conductor 115 of a potentiometer. As the member 111 moves transversely, more or less of the resistance is inserted into the circuit as is standard and well known in the potentiometer art.

Although the present invention has been set forth in exemplary forms and applications, it is to be understood that it may assume other configurations and utility, for electrical as indicated or for mechanical function, and it is not intended to be limited as to the spirit and scope of this invention except as set forth in the appended claims.

I claim:

1. Mechanism for selectively restraining movement and for axially moving a member with respect to a coil form comprising a ring, said ring having a plurality of transverse channels circumferentially positioned on said ring; each of said channels incorporating a central arcuate portion and an oppsoed retaining portion; a screw member, one portion of which is seated in said arcuate portion of said channel; flexible fingers protruding fraim said ring into said channel at an acute angle with respect to the channel, the sides of said fingers resiliently engaging said member; said arcuate portion and side wall fingers cooperatively forming between them a positioning support for said member; the sides of said fingers when in resilient engagement with said member firmly maintaining said member against said arcuate portion and providing against axial movement while stationary and providing for axial displacement thereof during rotation of said member.

2. Mechanism for selectively restraining movement and for axially moving a member with respect to a coil form comprising a ring, said ring having a plurality of transverse channels circumferentially positioned on said ring; each of said channels incorporating a central arcuate portion and an opposed retaining portion; a screw member, one portion of which is seated in said arcuate portion of said channel; a flexible finger integral with said ring and protruding from said ring into said channel at an acute angle with respect to the channel, said finger having a neutral position, the finger being spread from its neutral position by said member; a side of said finger resiliently engaging said member to create the retention bias against said member and pressing said member into engagement with the arcuate portion of said channel; the pressure applied by the resilient side of said finger and said arcuate portion supporting said member to firmly maintain said member against said arcuate portion and providing against axial movement while stationary and providing for axial displacement of said member during its rotation.

3. Mechanism for selectively restraining movement and for axially moving a member with respect to a coil form comprising a ring, said ring having a plurality of transverse channels circumferentially positioned on said ring; each of said channels incorporating a central arcuate portion and an opposed retaining portion; a screw member, one portion of which is seated in said arcuate portion of said channel; a plurality of fingers integral with said ring and protruding from said ring into said channel at an acute angle with respect to the channel, said fingers having a neutral position, the fingers being spread from their neutral position by said member; a side of said fingers resiliently engaging said member to create the retention bias against said member and pressing said member into engagement with the arcuate portion of said channel; the pressure applied by the resilient side of said finger and said arcuate portion supporting said member to firmly maintain said member against said arcuate portion and providing against axial movement while stationary and providing for axial displacement of said member during its rotation.

References Cited in the file of this patent

UNITED STATES PATENTS

| | | |
|---|---|---|
| 2,820,954 | Fay | Jan. 21, 1958 |
| 2,838,738 | Antalek et al. | June 10, 1958 |